(12) United States Patent
Trimmer et al.

(10) Patent No.: US 7,487,009 B2
(45) Date of Patent: Feb. 3, 2009

(54) SYSTEM AND METHOD FOR VIRTUAL VAULTING

(75) Inventors: Don Alvin Trimmer, Livermore, CA (US); Roger Stager, Livermore, CA (US); Craig Anthony Johnston, Livermore, CA (US); Rico Blaser, San Francisco, CA (US)

(73) Assignee: Netapp, Inc., Sunnyvale, CA (US)

( * ) Notice: Subject to any disclaimer, the term of this patent is extended or adjusted under 35 U.S.C. 154(b) by 151 days.

(21) Appl. No.: 11/294,955

(22) Filed: Dec. 6, 2005

(65) Prior Publication Data

US 2006/0074520 A1 Apr. 6, 2006

Related U.S. Application Data

(63) Continuation of application No. 10/387,319, filed on Mar. 12, 2003, now Pat. No. 6,973,369.

(51) Int. Cl.
*G06F 7/00* (2006.01)

(52) U.S. Cl. ........................................ 700/214; 700/215

(58) Field of Classification Search ................. 700/214, 700/215; 711/111, 112, 113, 115
See application file for complete search history.

(56) References Cited

U.S. PATENT DOCUMENTS 4,361,202 A 11/1982 Minovitch
4,635,145 A 1/1987 Horie et al.

(Continued)

FOREIGN PATENT DOCUMENTS

EP 1333379 4/2006

(Continued)

OTHER PUBLICATIONS

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

(Continued)

*Primary Examiner*—Gene O. Crawford
*Assistant Examiner*—Ramya G Prankasam
(74) *Attorney, Agent, or Firm*—Perkins Coie LLP

(57) ABSTRACT

The present invention is a tape library comprising both a small front-end portion and a larger back-end portion. The front-end portion is a visible virtual or physical tape library; and the back-end portion is a large invisible virtual or physical tape vault. The DPA is a typical DPA which only sees the front-end library. If desired, all messages regarding the importing and exporting of tapes are reviewed by an agent. The agent manages the automatic transfer of tapes between the front-end and the back-end, and notifies the user when a manual import or export is needed. This greatly reduces both the amount of hardware required to establish a virtual or physical tape library and also reduces the amount of labor required by a user to physically import and export tapes. If both the front-end library and the back-end vault are virtual and reside on the same virtual tape library appliance, no data movement is necessary and the tapes can be moved merely by performing small software state changes. In this case, manual operation may be acceptable.

17 Claims, 5 Drawing Sheets

U.S. PATENT DOCUMENTS

| | | |
|---|---|---|
| 4,727,512 A | 2/1988 | Birkner et al. |
| 4,775,969 A | 10/1988 | Osterlund |
| 5,235,695 A | 8/1993 | Pence |
| 5,297,124 A | 3/1994 | Plotkin et al. |
| 5,438,674 A | 8/1995 | Keele et al. |
| 5,455,926 A * | 10/1995 | Keele et al. .................... 711/4 |
| 5,465,289 A | 11/1995 | Kennedy, Jr. |
| 5,485,321 A | 1/1996 | Leonhardt et al. |
| 5,666,538 A | 9/1997 | DeNicola |
| 5,673,382 A | 9/1997 | Cannon et al. |
| 5,774,292 A | 6/1998 | Georgiou et al. |
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |
| 5,854,720 A | 12/1998 | Shrinkle et al. |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A * | 5/2000 | Gallo et al. .................... 714/13 |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,163,856 A | 12/2000 | Dion et al. |
| 6,173,359 B1 | 1/2001 | Carlson et al. |
| 6,185,421 B1 | 2/2001 | Alperovich et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,304,882 B1 | 10/2001 | Strellis et al. |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,792 B1 | 3/2002 | Murthy |
| 6,353,837 B1 | 3/2002 | Blumenau |
| 6,360,232 B1 | 3/2002 | Brewer et al. |
| 6,389,503 B1 | 5/2002 | Georgis et al. |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,650,948 B1 | 11/2003 | Atkinson et al. |
| 6,654,912 B1 | 11/2003 | Viswanathan et al. |
| 6,658,435 B1 | 12/2003 | McCall |
| 6,683,538 B1 | 1/2004 | Wilkes, Jr. |
| 6,690,292 B1 | 2/2004 | Meadows et al. |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 * | 11/2004 | Carlson et al. .............. 711/111 |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 | 4/2005 | Hart et al. |
| 6,915,397 B2 | 7/2005 | Lubbers et al. |
| 6,931,557 B2 | 8/2005 | Togawa |
| 6,950,263 B2 | 9/2005 | Suzuki et al. |
| 6,957,291 B2 | 10/2005 | Moon et al. |
| 6,973,534 B2 | 12/2005 | Dawson |
| 6,978,325 B2 | 12/2005 | Gibble |
| 7,032,126 B2 | 4/2006 | Zalewski et al. |
| 7,032,131 B2 | 4/2006 | Lubbers et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,107,417 B2 | 9/2006 | Gibble et al. |
| 7,111,136 B2 | 9/2006 | Yamagami |
| 7,127,388 B2 | 10/2006 | Yates et al. |
| 7,127,577 B2 | 10/2006 | Koning et al. |
| 7,143,307 B1 | 11/2006 | Witte et al. |
| 7,152,077 B2 | 12/2006 | Veitch et al. |
| 7,155,586 B1 | 12/2006 | Wagner et al. |
| 7,200,546 B1 | 4/2007 | Nourmohamadian et al. |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0095557 A1 | 7/2002 | Constable et al. |
| 2002/0133491 A1 | 9/2002 | Sim et al. |
| 2002/0144057 A1 | 10/2002 | Li et al. |
| 2002/0163760 A1 | 11/2002 | Lindsey et al. |
| 2002/0166079 A1 | 11/2002 | Ulrich et al. |
| 2002/0171546 A1 | 11/2002 | Evans et al. |
| 2002/0199129 A1 | 12/2002 | Bohrer et al. |
| 2003/0004980 A1 | 1/2003 | Kishi et al. |
| 2003/0037211 A1 | 2/2003 | Winokur |
| 2003/0097462 A1 | 5/2003 | Parent et al. |
| 2003/0120476 A1 | 6/2003 | Yates et al. |
| 2003/0120676 A1 | 6/2003 | Holavanahalll et al. |
| 2003/0126388 A1 | 7/2003 | Yamagami |
| 2003/0135672 A1 | 7/2003 | Yip et al. |
| 2003/0149700 A1 | 8/2003 | Bolt |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0181388 A1 | 9/2004 | Yip et al. |
| 2004/0181707 A1 | 9/2004 | Fujibayashi |
| 2005/0010529 A1 | 1/2005 | Zalewski et al. |
| 2005/0044162 A1 | 2/2005 | Liang et al. |
| 2005/0063374 A1 | 3/2005 | Rowan et al. |
| 2005/0065962 A1 | 3/2005 | Rowan et al. |
| 2005/0066118 A1 | 3/2005 | Perry et al. |

| | | |
|---|---|---|
| 2005/0066222 A1 | 3/2005 | Rowan et al. |
| 2005/0066225 A1 | 3/2005 | Rowan et al. |
| 2005/0076070 A1 | 4/2005 | Mikami |
| 2005/0076261 A1 | 4/2005 | Rowan et al. |
| 2005/0076262 A1 | 4/2005 | Rowan et al. |
| 2005/0076264 A1 | 4/2005 | Rowan et al. |
| 2005/0144407 A1 | 6/2005 | Colgrove et al. |
| 2006/0047895 A1 | 3/2006 | Rowan et al. |
| 2006/0047902 A1 | 3/2006 | Passerini |
| 2006/0047903 A1 | 3/2006 | Passerini |
| 2006/0047905 A1 | 3/2006 | Matze et al. |
| 2006/0047925 A1 | 3/2006 | Passerini |
| 2006/0047989 A1 | 3/2006 | Delgado et al. |
| 2006/0047998 A1 | 3/2006 | Darcy |
| 2006/0047999 A1 | 3/2006 | Passerini et al. |
| 2006/0143376 A1 | 6/2006 | Matze et al. |

FOREIGN PATENT DOCUMENTS

| | | |
|---|---|---|
| EP | 1 671 231 | 6/2006 |
| EP | 1 671231 | 6/2006 |
| WO | 98/54682 | 12/1998 |
| WO | WO99/03098 | 1/1999 |
| WO | WO99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library for Legato NetWorker Data Protection Solution" Alacritus Software, Inc., Jan. 8, 2002.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership In Backup Arena" InfoStor, Nov. 2001.

Preston, W. Curtis, "Suprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalabillty" Alacritus Software, Jul. 8, 2002.

Camphuisen, Alicia, "Hitachi Inks OEM Deal with Legato" Knapp Comm., Jul. 17, 2002.

"Alacritus Announces Disk-Based Successor to Tape", Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alactritus Lines Up OEM Partners for Virtual Tape Library Push" The (451) Storage & Systems, Oct. 4, 2002.

Komiega, Kevin, "Vendor Pushes Disk Backup Over Tape" Search Storage.com Jan. 10, 2003.

"Alacritus Software's Securitus I: Pointing the Way to Virtual Tape Libraries" Aberdeen Group, Inc., Mar. 2002.

"Product Brief: Rhapsody/Alacritus-Securitus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Disk-Based protection" Alacritus Software, Inc., Jul. 2001.

"Disk-Based Data Protection" Alacritus Software, Inc. Sep. 2002.

Komiega, Kevin, "Vendor Pushes Disk Backup Over Tape" SearchStorage.com, Jan. 10, 2003.

Payack, Paul JJ, "Alacritus Lines Up OEM Partners for Virtual Tape Library Push" The (451) Storage& Systems, Oct. 4, 2002.

"Alacritus Announces Disk-Based Successor to Tape" Knapp Comm., Aug. 21, 2002.

"Alacritus Software's Securitus 1: Pointing the Way to Virtual Tape Libraries" Aberdeen Group, Inc., Mar. 2002.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virual Tape Library Solution: Securitus I Heralds Advent of 'Disruptive Technology' that Serves as Replacement to Tape Libraries" Alacritus Software, Inc., Jun. 25, 2001.

Preston, W. Curtis, "Surprise! Cheap Disks Cure Slow Backup" Storage Magazine, Jun. 1, 2002.

Camphuisen, Alicia, "Hitachi Inks OEM Deal with Legato" Jul. 17, 2002.

"Alacritus Announces Disk-Based Successor to Tape" Aug. 21, 2002.

"Securitus I White Paper: Disk Based Data Protection from Alacritus Software" Alacritus Software, Inc., Jul. 2001.

"Disk-Based Data Protection" Alacritus Software, Inc. Sep. 2001.

Payack, Paul JJ, "Alactritus Lines Up OEM Partners for Virtual Tape Library Push" The (451) Storage & Systems, Oct. 4, 2002.

"Securitus I White Paper: Disk Based Data Protection for Alacritus Software" Alacritus Software, Inc., Jul. 2001.

"Disk-Based Data Protectoin" Alacritus Software, Inc. Sep. 2002.

Payack, Paul JJ, "Alacritus Lines Up OEM Partners for Virtual Tape Library Push" The (451) Storage& Systems, Oct. 4, 2002.

"Alacritus Announces Disk-Based Successor to Tape" Knapp Comm., Aug. 21, 2002.

"Alacritus Software's Securitus 1: Pointing the Way to Virtual Tape Libraries" Aberdeen Group, Inc., Mar. 2002.

Biggar, Heigi, "Disk and Tape Forge New Partnership in Backup Arena" InfoStor, Nov. 2001.

"Alacritus Software and Phapsody Networks to Develop Breakthrough Backup Solutions for Storage Networks: Companies to Provide First Network—Intelligent Virtual Tape Solution Resulting in Dramatic ROI, Increases in Data Backup performance and Scalability" Alacritus Software, Jul. 8, 2002.

"Securitus I White Paper: Disk Based Data Protection for Alacritus Software" Alacritus Software, Inc., Jul. 2001.

"Disk-Based protection" Alacritus Software, Inc., Jul. 2001.

* cited by examiner

SYSTEM AND METHOD FOR VIRTUAL VAULTING

CROSS REFERENCE TO RELATED APPLICATIONS

This application is a continuation of U.S. patent application Ser. No. 10/387,319, filed on Mar. 12, 2003, which is incorporated herein by reference as if fully set forth.

BACKGROUND

The present invention is generally related to storage systems. More particularly, the invention is directed to a disk-based storage system, which provides one or more back-end virtual vaults to one or more front-end visible virtual or physical tape libraries.

In physical or virtual tape libraries, users often purchase a relatively small tape library and license their backup application code for the relatively small tape library due to the tremendous expense associated with large tape libraries. Referring to FIG. 1, a typical small tape library 10 comprises a plurality of media slots 12 and one or more tape drives 14. The tape library 10 keeps track of all of the tapes in the media slots 12 and the tape drives 14, and provides overall management of the tapes. When a user desires to read from or write to a tape, the tape is removed from a media slot 12 and placed into the tape drive 14. Of course, the tapes 16 do not reside within the tape library 10 in perpetuity. Accordingly, tapes 16 may be removed from the tape library 10 to become external tapes 18. These external tapes are typically stored offsite for security or archiving purposes. External tapes 18 may also be imported into the tape library 10 as desired as long as there are enough media slots 12 available.

Although having a small tape library 10 is an inexpensive way, (in terms of hardware), for an organization to implement data storage using tapes, it is a relatively labor intensive environment. Since the tape library is small, the user is forced to continuously import and export tapes to and from the tape library 10 so that needed tapes can be utilized by the tape drive 14.

To alleviate the labor problem, a larger tape library may be used. Such a larger tape library is shown in FIG. 2. In this large tape library 20, 166 media slots 12 are provided. Although only two tape drives 14 are shown for simplicity, those skilled in the art would realize that more tape drives 14 would typically be provided for a tape library of this size unless the system is used exclusively for archiving purposes. As one could obviously deduce, having such a large tape library 20 would relieve the user from having to import and export tapes on a frequent basis.

However, large tape libraries 20 have the drawback that they are much more expensive in terms of the hardware and, equally importantly, the library software license.

A seemingly unrelated problem is the desire of physical tape library vendors to include a virtual tape library as a relatively small front-end cache. In order to do this, the virtual tape library cache must be able to track tapes that have been exported to a physical tape library and import the appropriate tapes whenever the data protection application (DPA) needs access to tapes that are not located within the virtual library. Unfortunately, the DPA cannot distinguish between tapes that have been completely exported and shipped off-site and tapes that have simply been moved electronically or robotically to a back-end vault.

Thus, the problem of importing and exporting tapes to and from a tape library is closely related to the problem of designing a small front-end cache to a large library. This is because much of the work in designing such a cache involves moving media between the front-end cache and the backend vault, effectively exporting media from one library and importing this media into the other and keeping track of this interaction.

Accordingly, present tape library configurations leave much to be desired in terms of flexible import/export mechanisms; particularly when media is moved between multiple libraries.

SUMMARY

The present invention is a tape library comprising both a small front-end portion and a larger back-end portion. The front-end portion is a visible virtual or physical tape library; and the back-end portion is a large invisible virtual or physical tape vault. The DPA is a typical DPA which only sees the front-end library. If desired, all messages regarding the importing and exporting of tapes are reviewed by an agent. The agent manages the automatic transfer of tapes between the front-end and the back-end, and notifies the user when a manual import or export is needed. This greatly reduces both the amount of hardware required to establish a virtual or physical tape library and also reduces the amount of labor required by a user to physically import and export tapes. If both the front-end library and the back-end vault are virtual and reside on the same virtual tape library appliance, no data movement is necessary and the tapes can be moved merely by performing small software state changes. In this case, manual operation may be acceptable.

BRIEF DESCRIPTION OF THE DRAWING(S)

DETAILED DESCRIPTION OF THE PREFERRED EMBODIMENT(S)

Figure 1:
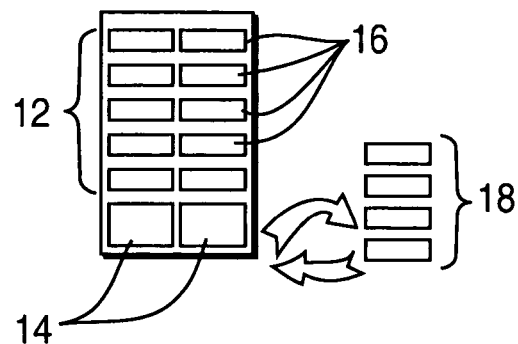
FIG. 1 is a prior art small tape library.
Figure 2:
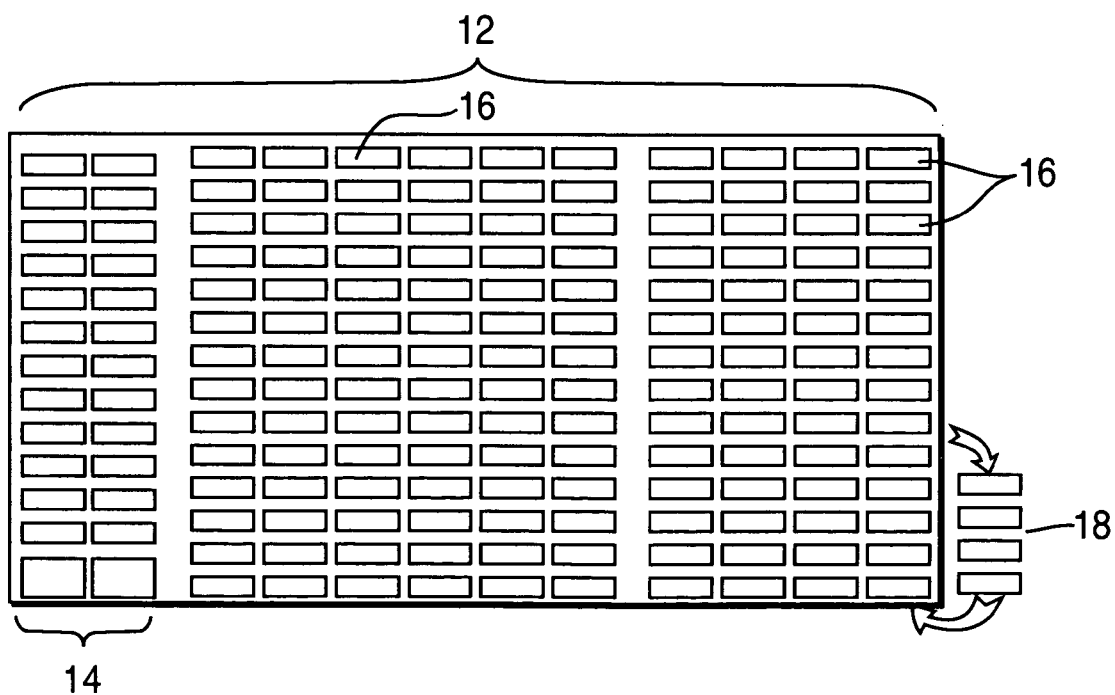
FIG. 2 is a prior art large tape library.

The present invention will be described with reference to the drawing figures where like numerals represent like elements throughout.

Figure 3:
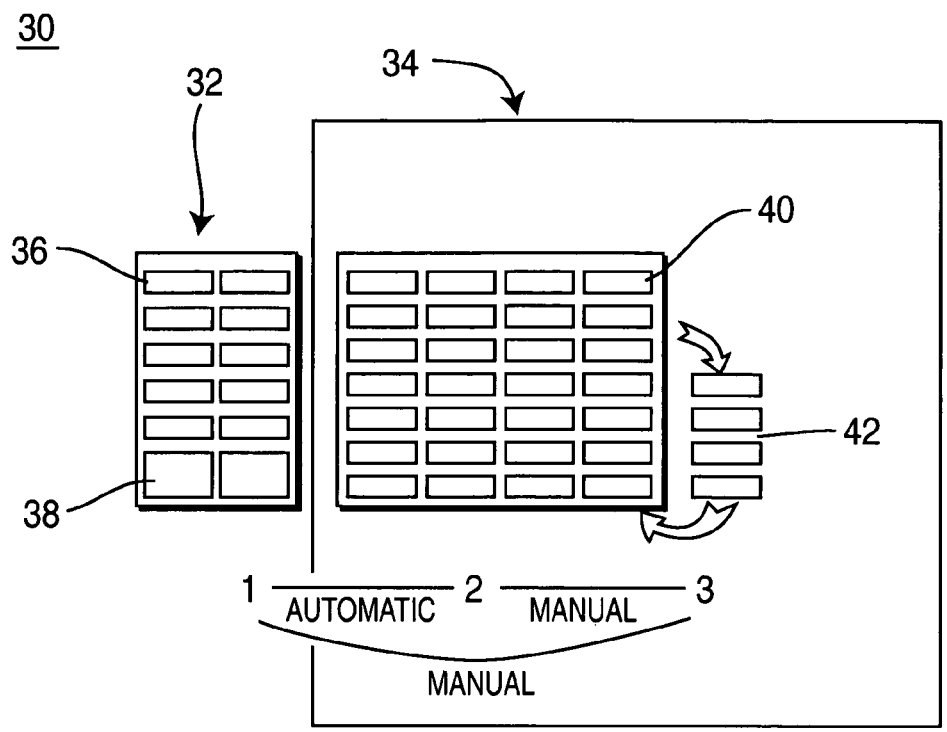
FIG. 3 is a tape library made in accordance with the present invention having both a visible front-end and an invisible back-end.

Referring to FIG. 3, a tape library system 30 made in accordance with the present invention is shown. The tape library system 30 comprises a front-end, visible virtual or physical tape library 32 and a back-end, invisible virtual or physical tape vault. As is evident from FIG. 3, the back-end library does not necessarily need to include any tape drives if it is used solely for vaulting purposes. Alternatively, one or more tape drives may be included if desired.

Hereinafter, reference will be made only to "tape library" or "tape vault" for simplicity. However, these terms should be understood by those skilled in the art to refer to both virtual or physical tape devices comprising an active medium (such as a disk drive), a passive medium (such as a tape cartridge), or a combination of both active and passive media. The front-end tape library 32 comprises a plurality of media slots 36 and a plurality of tape drives 38. Although there are ten media slots 36 and two tape drives 38 in the embodiment shown in FIG. 3, one skilled in the art would clearly realize that any number of media slots 36 and/or tape drives 38 may be utilized. The back-end tape vault comprises additional media slots 40 for seemingly exported tapes. Exported or external tapes are shown as tapes 42.

The DPA that is used in the front-end tape library 32 only sees tapes that are in the front-end tape library 32. Accordingly, the DPA operates in a manner that is exactly the same as with current tape libraries since current DPAs cannot distinguish between a virtual tape library and a physical tape library, or between a tape library with a vault and a tape library without a vault. However, as will be explained in greater detail hereinafter, the present invention may include an agent that intercepts all import and export messages from the DPA such that when a tape is exported from the front-end tape library 32, it may be exported only to the back-end invisible tape vault 34, and not exported as an external tape 42.

The back-end invisible tape vault 34 provides additional media slots 40 such that a tape exported from the front-end tape library 32 will be exported only to the back-end tape vault 34. When the DPA calls up a tape that it assumes was exported, the tape may actually reside within the back-end tape vault 34. The agent retrieves the tape from the back-end tape vault 34 and imports it into the front-end tape library 32 automatically, thus freeing the user from having to perform a manual tape import or export. Referring to the bottom of FIG. 3, the prior art required a manual intercession by the user in order to take the tapes from the front-end tape library at point one (1) and export them as external tapes 42 at point three (3). In contrast, the present invention provides an intermediate point two (2) by automatically transferring tapes between points one (1) and two (2) from the front-end tape library 32 to the back-end tape vault 34. Once the back-end tape vault 34 is full or, more typically, if a tape needs to be moved off-site either electronically or physically, a manual intercession by the user as shown between points two (2) and three (3) may be required to export the tapes as exported external tapes 42.

Figure 4:
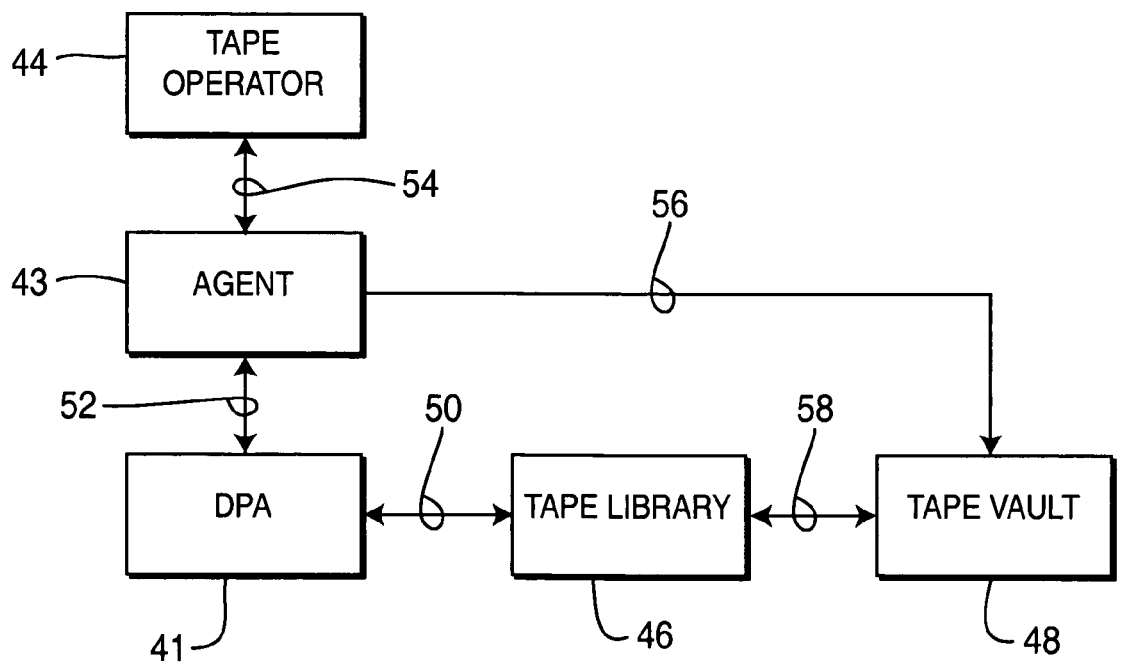
FIG. 4 is a block diagram of the internal information flow of the system of the present invention.

Referring to FIG. 4, a flow diagram of the internal information flow within the information storage system 30 of the present invention is shown. As shown, the information flow is between the DPA 41, the agent 43, the tape operator 44, the tape library 46 and the tape vault 48. Point one (1) of FIG. 3 represents normal interaction between the DPA 41 and a tape library 46. From the perspective of the DPA 41, the communication 50 between the DPA 41 and the tape library 46 is normal. Additionally, when the DPA 41 desires to import or export a tape, it sends a communication 52 to the tape operator 44. However, in accordance with the present invention, the communication 52 is intercepted by the agent 43. The agent 43 provides overall control and tracking of the tapes that are within the tape vault 48. If a tape is within the tape vault 48, the agent 43 sends a communication 56 to the tape vault 48 requesting that the tape vault 48 move the desired tape from the tape vault 48 to the tape library 46. If the desired tape is not in the tape vault 48, the agent 43 forwards a message via a communication 54 to the tape operator 44 requesting that the tape operator 44 manually insert a tape into the tape library 46 or, in an alternative embodiment, to the tape vault 48.

With respect to the DPA 41 requesting that a tape be exported from the tape library 46, the same process is followed. The DPA 41 requests the tape operator 44 via a communication 52 to remove a tape from the tape library 46. The agent 43 intercepts this communication 52 and, if there is enough storage within the tape vault 48, sends a communication 56 to the tape vault 48 requesting that the tape vault 48 accept the tape from the tape library 46 via a communication 58. If there is no room within the tape vault 48, the agent 43 passes the message via a second communication 54 to the tape operator 44 requesting that the tape operator 44 remove the tape from the tape library 46 or, in an alternative embodiment, from the tape vault 48.

Accordingly, a tape could be removed from the tape vault 48, which could automatically trigger the tape vault 48 to fetch the tapes in the entry/exit slot of the front-end library 46 because it now definitely has free space; or the tape could be removed from the front-end library 46 directly. The DPA 41 cannot track the different states once a tape is out of the front-end library 46 unless the user manually enters this information. For example, the DPA 41 does not know if the tape is currently in the mailroom, in the FedEx central office, or simply lost. Similarly, it does not know whether it is in the tape vault 48.

Figure 5:
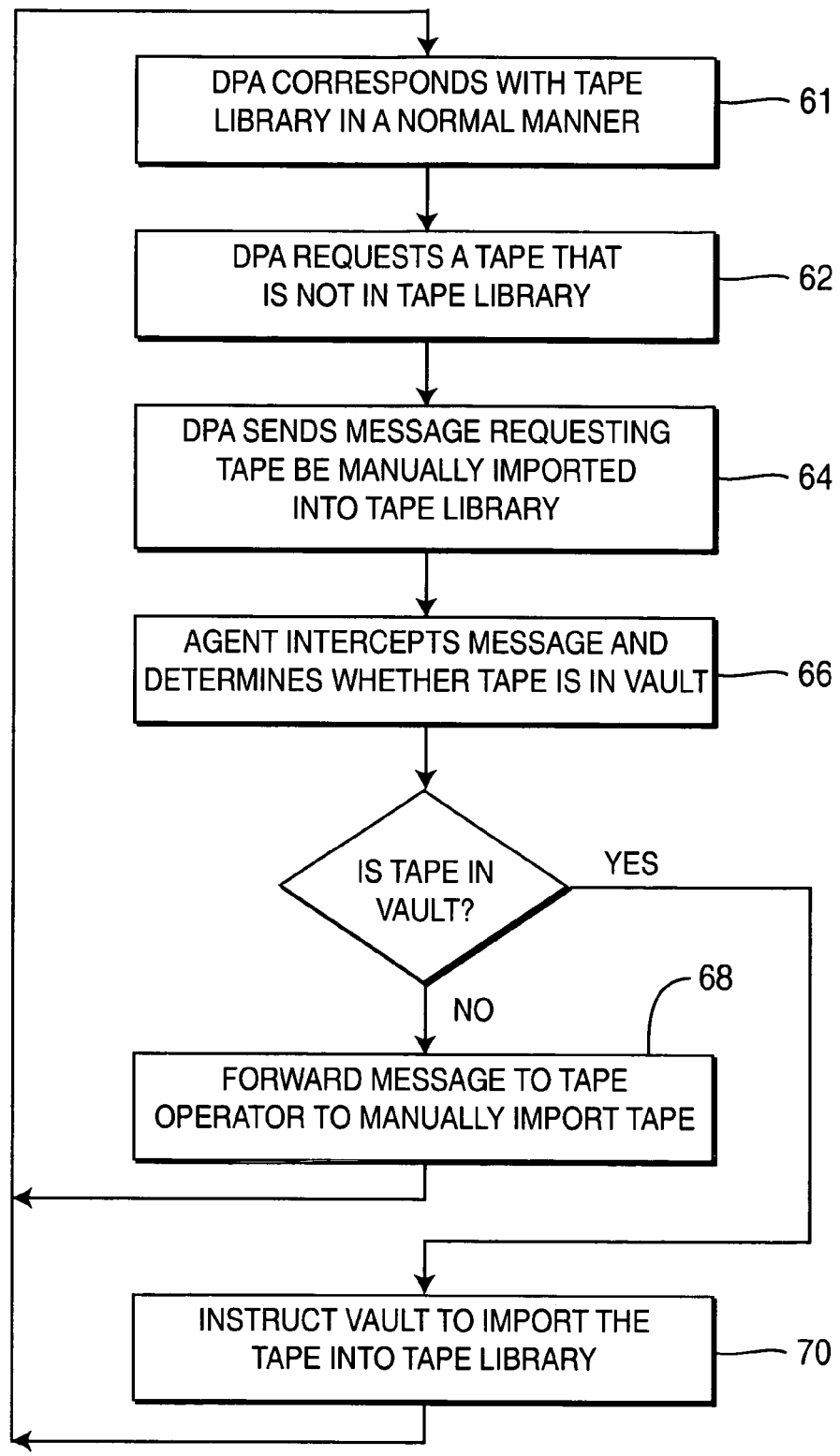
FIG. 5 is a method for importing a tape in accordance with the preferred embodiment of the present invention.

Referring to FIG. 5, a method 60 for importing a tape in accordance with the present invention is shown. A DPA corresponds with a tape library in a normal manner (step 61). When the DPA requests a tape that is not in the tape library, (step 62), the DPA sends a message requesting that a tape be manually imported into the tape library (step 64). The agent intercepts the message and determines whether or not the requested tape is in the tape vault (step 66). If the tape is not in the tape vault, the agent forwards a message to the tape operator to manually import the tape (step 68). If the tape is located in the tape vault, the agent instructs the tape vault to import the tape into the tape library (step 70).

Figure 6:
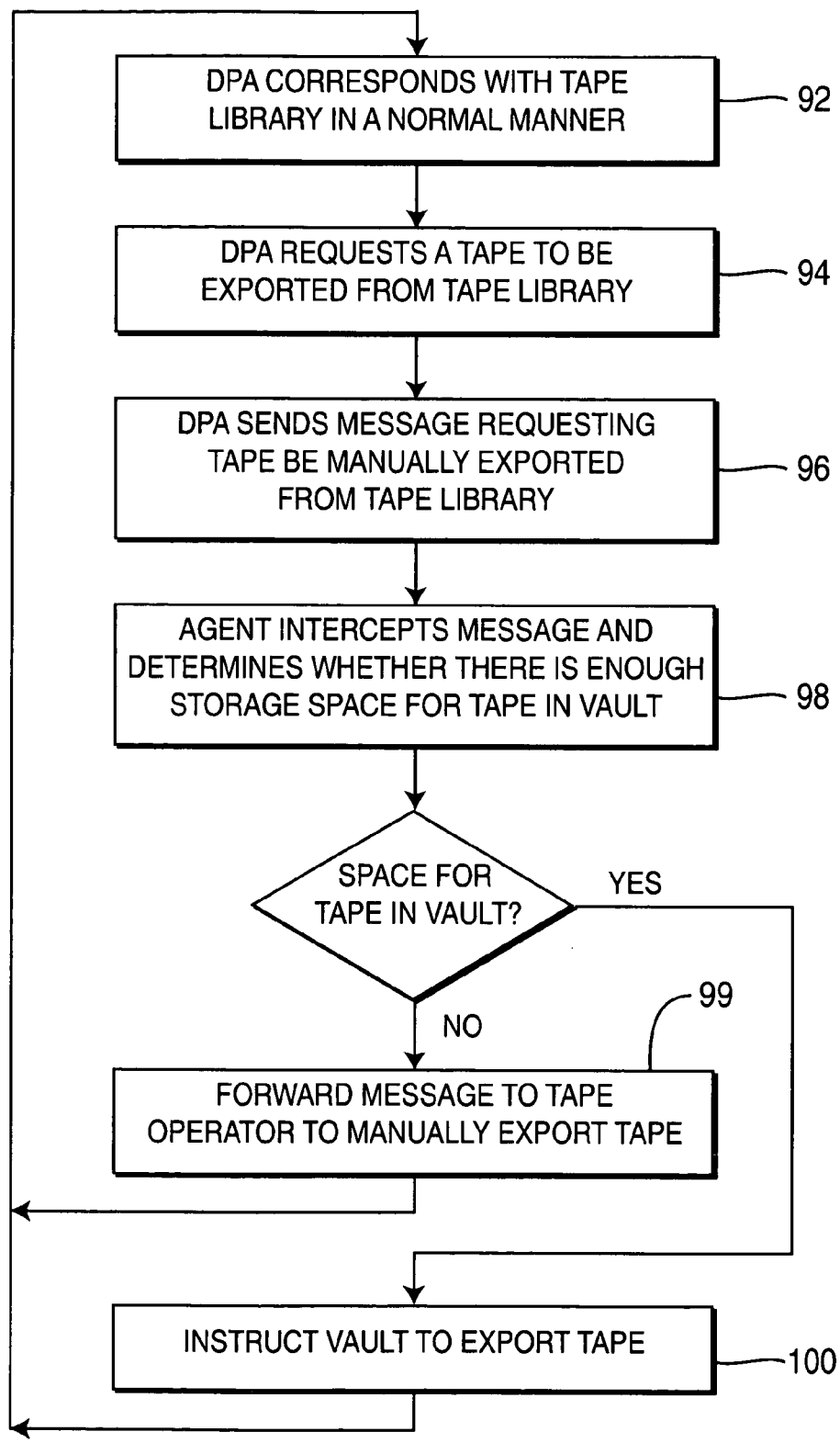
FIG. 6 is a method for exporting a tape in accordance with the preferred embodiment of the present invention.

Referring to FIG. 6, a method 90 for exporting a tape in accordance with the present invention is shown. In this method, the DPA corresponds with the tape library in a normal manner (step 92). When the DPA requests that a tape be exported from the tape library (step 94), the DPA sends a message requesting that the tape be manually exported, (i.e., moved to the entry/exit slot of the tape library), from the tape library (step 96). The agent intercepts this message and determines whether there is enough storage space in the vault (step 98).

The intercepted signal, like the signal described in connection with FIG. 5, may be any type of signal. For example, the signal may be an E-mail (SMTP and MAPI), Pager, Printer, Net send, SNMP, Windows NT Event Log entry or any other type of signal that asks the operator to import or export a tape.

Referring again to FIG. 6, if there is enough space for the tape in the vault, the agent instructs the vault to export the tape automatically from the tape library (step 100) so that the tape may be stored therein. However, if there is not enough space for the tape in the vault, the agent forwards a message to the tape operator to manually export the tape (step 99) or to free space in the vault.

In accordance with the present invention, tapes can be exported from a relatively small library to a larger tape vault and other tapes from the larger tape vault into the tape library. Since this operation is under programmatic control, this process is much less labor intensive than handling of physical tapes. This process can be completely automated.

Figure 7:
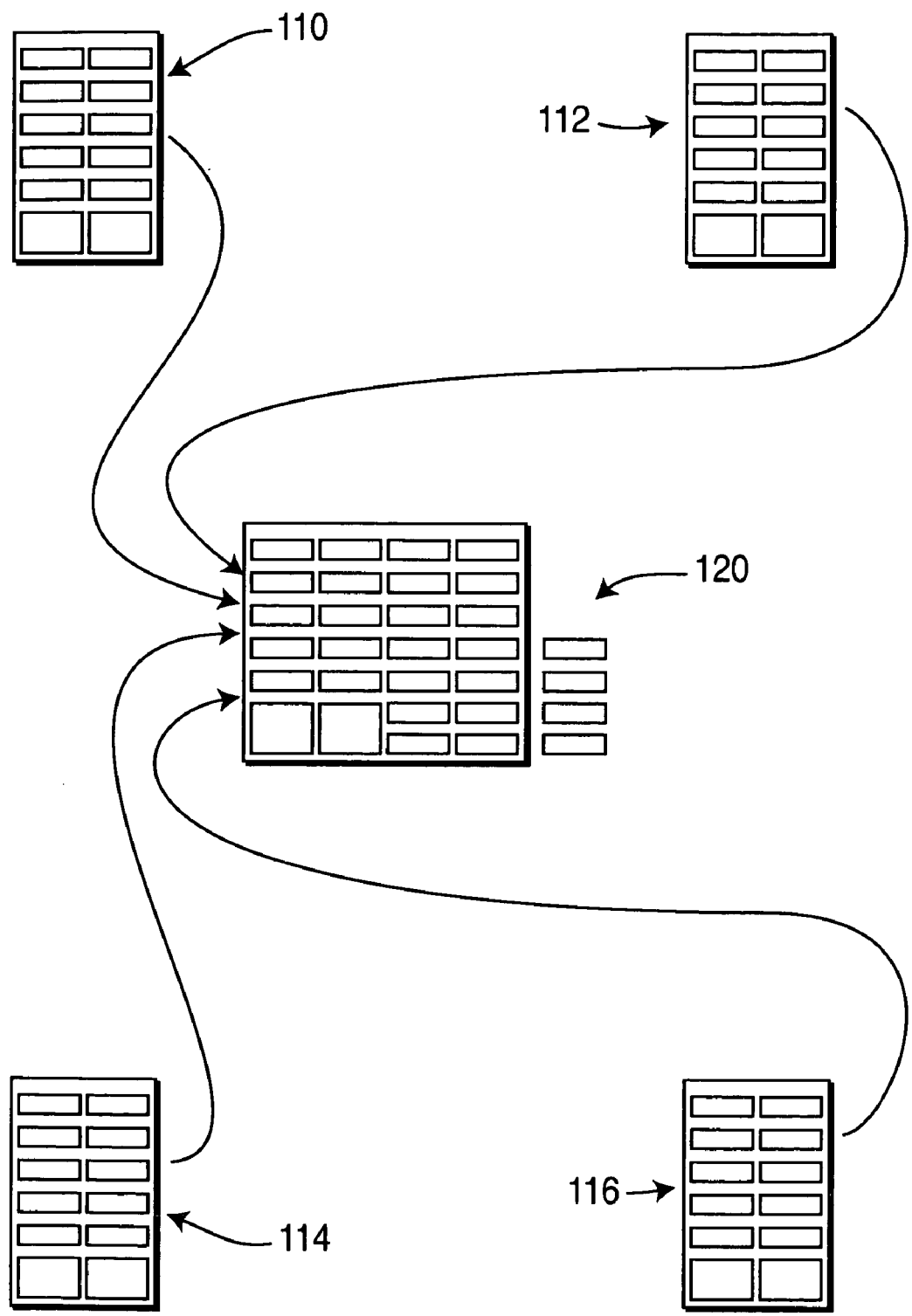
FIG. 7 is an alternative embodiment of the present invention.

The present invention has the following advantages. First, it allows for simple implementation of one or more small front-end tape libraries that share a large physical tape vault. For example, as shown in FIG. 7, a plurality of small front-end physical tape libraries 110, 112, 114, 116 may be linked to a single tape vault 120. A single agent associated with the tape vault 120 will provide overall control of importing and exporting of tapes from all of the small front-end tape libraries 110, 112, 114, 116 and the tape vault 120. The agent may queue DPA requests from multiple front-end libraries and execute them in sequence, or may prioritize them according to a management policy. All other aspects of the system are the same for a multiple front-end tape library set up as shown in FIG. 7 as with the single front-end tape library embodiment shown in FIG. 3. The communications between the multiple small front-end tape libraries 110, 112, 114, 116 and the tape vault 120 will be the same as shown in FIG. 4 and as explained with reference to the procedures 60, 90 in FIGS. 5 and 6 respectively.

The present invention also makes it extremely easy to "clone" tapes. This is useful when one copy of a tape needs to be shipped off-site and another copy of the identical tape is kept on-site for fast restores. In this scenario, whenever a tape is written to and is subsequently removed from a tape drive, it is copied (instead of moved) to the tape vault. If data is appended to an existing tape, it is simply written in the front-end tape library and upon removal from a drive, the append is written to the back-end tape.

Since the DPA is only aware of the small front-end library, the back up software can be purchased for the small library, rather than a large back-end tape vault. For the example shown in FIG. 3, the DPA only sees ten (10) media slots even though the vault extension expands the library to a thirty-eight (38) slot library.

In an alternative embodiment, no agent is used. Instead, several slots in the front-end library are reserved. These slots are then used to rotate media from the back-end library through. Whenever a new set of media is moved from the back-end library to the reserved slots, the backup application is informed, (for example, via standard SCSI commands), that an inventory change has occurred. The backup software then reads the new inventory and fetches the tapes it needs from the reserved slots. The two approaches can also be combined. For example, the most frequent import/export operation is to move full tapes out of the library to replace them with empty tapes. This can be completely automated. Once a tape is full and moved to a slot in the library, the tape can immediately be replaced by a blank tape and the backup application can be informed of the inventory change. This avoids many export requests altogether.

What is claimed is:

1. A storage system comprising:
   a front-end portion configured to store at least one tape;
   a data protection application running on the front-end portion;
   a back-end portion configured to store tapes exported from the front-end portion; and
   an agent configured to intercept messages sent by the data protection application;
   wherein in response to the agent intercepting a message from the data protection application requesting an end user to manually import a tape located in the back-end portion, the agent automatically transfers the tape to the front-end portion from the back-end portion without forwarding the intercepted message.

2. The storage system of claim 1 wherein the front-end portion is a tape library.

3. The storage system of claim 1 wherein the back-end portion is a tape vault.

4. The storage system of claim 1 wherein the data protection application is unaware of the back-end portion.

5. The storage system of claim 1 wherein in response to the agent intercepting a message from the data protection application requesting an end user to manually export a tape from the front-end portion, the agent transfers the tape to an empty space in the back-end portion without forwarding the intercepted message.

6. The storage system of claim 1 wherein the front-end portion is one of a plurality of front-end portions that share the back-end portion.

7. A method for managing the transfer of tapes in a storage system having at least one front-end portion and a back-end portion, the method comprising the steps of:
   intercepting a message sent from a data protection application to an operator requesting a tape be manually imported to a front-end portion of a tape library;
   determining whether the requested tape is located in a back-end portion of the tape library;
   importing the requested tape volume from the back-end portion to the front-end portion where the determination is positive; and
   forwarding the intercepted message along to the operator where the determination is negative.

8. The method of claim 7 wherein the front-end portion is a tape library.

9. The method of claim 7 wherein the back-end portion is a tape vault.

10. The method of claim 7 wherein the data protection application is running on the front-end portion and is unaware of the existence of the back-end portion.

11. The method of claim 7 wherein the front-end portion is a one of a plurality of front-end portions that share the back-end portion.

12. The method of claim 7 further comprising the steps of:
    intercepting a message sent from a data protection application to an operator requesting a tape be manually exported from a front-end portion of a tape library;
    determining whether the requested tape may be stored in a back-end portion of the tape library;
    importing the requested tape volume from the front-end portion to the back-end portion where the determination is positive; and
    forwarding the intercepted message along to the operator where the determination is negative.

13. An agent for managing the transfer of tapes in a storage system comprising:
    the agent being configured to intercept messages in a storage system having a front-end portion running a data protection application and a back-end portion; and
    wherein if the agent intercepts a message from the data protection application requesting an end user to manually import a tape located in the back-end portion, the agent automatically transfers the tape to the front-end portion without forwarding the intercepted message.

14. The agent of claim 13 wherein the front-end portion is a tape library.

15. The agent of claim 13 wherein the back-end portion is a tape vault.

16. The agent of claim 13 wherein if the agent intercepts a message from the data protection application requesting an end user to manually export a tape from the front-end portion, the agent transfers the tape to an empty space in the back-end portion without forwarding the intercepted message.

17. The agent of claim 13 wherein the front-end portion is one of a plurality of front-end portions that share the back-end portion.

* * * * *